United States Patent [19]

Seymour et al.

[11] Patent Number: 4,904,748

[45] Date of Patent: Feb. 27, 1990

[54] BLENDS OF POLY(ETHERESTERS) AND POLYESTERS

[75] Inventors: Robert W. Seymour; Thomas E. Flora, both of Kingsport, Tenn.

[73] Assignee: Eastman Kodak Company, Rochester, N.Y.

[21] Appl. No.: 151,727

[22] Filed: Feb. 3, 1988

[51] Int. Cl.$^4$ .............................................. C08L 67/02
[52] U.S. Cl. ..................................... 525/444; 524/539
[58] Field of Search .......................................... 525/444

[56] References Cited

U.S. PATENT DOCUMENTS

| | | | |
|---|---|---|---|
| 3,023,192 | 2/1962 | Shivers, Jr. ............................ | 260/75 |
| 3,261,812 | 7/1966 | Bell et al. ............................... | 260/75 |
| 3,751,014 | 3/1972 | Witsiepe ............................. | 260/75 R |
| 4,003,882 | 1/1977 | Fagerburg et al. ................ | 260/75 R |
| 4,221,703 | 9/1980 | Hoeschele .................... | 260/45.9 NC |
| 4,256,860 | 3/1981 | Davis et al. .......................... | 525/437 |
| 4,349,469 | 9/1982 | Davis et al. .......................... | 524/765 |

FOREIGN PATENT DOCUMENTS

| | | |
|---|---|---|
| 0297423 | 1/1984 | European Pat. Off. . |
| 2255345 | 7/1975 | France . |
| 1431916 | 4/1976 | United Kingdom . |

*Primary Examiner*—Patricia Short
*Attorney, Agent, or Firm*—John F. Stevens; William P. Heath, Jr.

[57] ABSTRACT

Disclosed are compositions comprising a blend of blends comprising (A) about 98–2 weight % of a flexible poly(etherester) having recurring units from 1,4-cyclohexanedicarboxylic acid having a trans isomer content of at least 70%, a glycol component consisting essentially of 1,4-cyclohexanedimethanol and poly(oxytetramethylene) glycol.

(B) about 2–98 weight % of a relatively rigid polyester, the blends having improved stiffness and notched Izod impact strength when compared to the poly(etherester) alone.

3 Claims, No Drawings

BLENDS OF POLY(ETHERESTERS) AND POLYESTERS

TECHNICAL FIELD

This invention relates to blends of flexible poly(etheresters) and rigid polyesters having unexpected levels of stiffness and notched Izod impact strength when compared with these properties of the poly(etherester) alone.

BACKGROUND OF THE INVENTION

Poly(etheresters) of trans-1,4-cyclohexanedicarboxylic acid, 1,4-cyclohexanedimethanol, polly(oxytetramethylene) glycol and a branching agent are disclosed in U.S. Pat. No. 4,349,469. Other patents of interest include U.S. Pat. Nos. 4,003,882; 3,261,812; 3,023,192; 4,221,703; 3,651,014; and 4,256,860. None of these patents, however, suggests that the flexible polyesters described above would show improved physical properties if blended with certain polyesters as described herein.

DISCLOSURE OF THE INVENTION

The blends according to this invention are particularly useful in thermoforming processes, where the blends are first formed into a sheet and subsequently thermoformed by the application of heat and pressure, using conventional well known techniques, to form the finished article. In some applications, such as structural panels for automobiles, improved stiffness and notched Izod impact strength are highly desirabe. Also, the presence of the relatively rigid polyester (a less crystalline polymer) in the blend makes the blend more easily thermoformed. The blends are also useful in conventional injection molding and extrusion applications.

According to the present invention, there are provided blends of a flexible poly(etherester) with a more rigid polyester, the blends comprising (A) about 98-2 weight % of a flexible poly(etherester) having an I.V. of about 0.8-1.5 and recurring units from
 (1) a dicaraboxylic acid component consisting essentially of 1,4-cyclohexanedicarboxylic acid having a trans isomer content of at least 70%,
 (2) a glycol component consisting essentially of
  (a) about 95 to about 65 mol % 1,4-cyclohexanedimethanol, and
  (b) about 5 to about 35 mol % poly(oxytetramethylene) glycol having a molecular weight of about 500 to about 1100, and (B) about 2-98 weight % of a relatively rigid polyester having recurring units from about 80-100 mol % terephthalic acid and at least one aliphatic or cycloaliphatic glycol having 2-12 carbon atoms, said polyester having an I.V. of about 0.5-1.0, the blends having improved stiffness when compared to the poly (etherester) alone.

Moreover, it has also been found that the blends have unexpectedly improved notched Izod impact strengths when compared to the poly(etherester) alone when the blends contain about 98-60 wt % of the flexible poly(esterether) and about 2-40 wt % of the relatively rigid polyester.

The dibasic acid component of the poly(esterether) of this invention consists essentially of 1,4-cyclohexanedicarboxylic acid having a trans isomer content of at least 70%, preferably at least 80% and most preferably at least 85% trans isomer content.

1,4-Cyclohexanedicarboxylic acid and 1,4-cyclohexanedimethanol are well known in the art and commercially available. "Man-Made Fibers: Science and Technology," Vol. III, edited by Mark, Atlas and Cernia, published by Interscience Publishers describes preparation of 1,4-cyclohexanedicarboxylic acid and 1,4-cyclohexanedimethanol at page 85.

The poly(oxytetramethylene) glycol component of this invention is commercially available, and is prepared by well known techniques. The poly(oxytetramethylene) glycol has a molecular weight of between about 500 and about 1100, preferably about 1000 (weight average). It is used in an amount of from about 5 to about 35 mol %, preferably about 8-15%, based on the total glycol mol %.

The poly (esterether) of this invention further may comprise up to about 1.5 mol %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane, trimethylol propane, and trimer acid.

It should be understood that the total acid reactants should be 100 mol %, and the total glycol reactants should be 100 mol %. Although the acid reactant is said to "consist essentially of" 1,4-cyclohexanedicarboxylic acid, if the branching agent is a polybasic acid or anhydride, it will be calculated as part of the 100 mol % acid. Likewise, the glycol reactant is said to "consist essentially of" 1,4-cyclohexanedimethanol and poly(oxytetramethylene) glycol, if the branching agent is a polyol, it will be calculated as part of the 100 mol % glycol.

The poly(esterethers) of this invention preferably include a phenolic antioxidant. It is preferred that the phenolic antioxidant be hindered and relatively nonvolatile. Tetrakis[methylene-(3,5-di-tert-butyl-4-hydroxyhydrocinnamate)methane] which is commercially available from Geigy Chemical Company as Irganox 1010 antioxidant, is preferred. Preferably, the antioxidant is used in an amount of from about 0.1 to about 1.0, based on the weight of copolyesterether.

The trans and cis isomer contents of the final copolyesterether are controlled in order to give polymers that setup or crystallize rapidly. Cis and trans isomer contents are measured by conventional methods well known to those skilled in the art. See, for example, U.S. Pat. No. 4,349,469.

The poly(etherester) used in this invention may be prepared by conventional techniques. See, for example, U.S. Pat. No. 4,349,469.

The polyester used in this invention may be prepared by conventional techniques using an acid component consisting essentially of terephthalic acid. Minor amounts of other conventionally used dicarboxylic acids (up to about 10%) such as isophthalic, naphthalene dicarboxylic or aliphatic dicarboxylic acids having about 4 to 12 carbon atoms may be used. Conventional glycols, or combinations of glycols for copolymers, having 2 to 12 carbon atoms may be used. The preferred glycols are ethylene glycol, 1,4-butanediol and 1,4-cyclohexanedimethanol, and combinations thereof. Especially preferred glycols are ethylene glycol and 1,4-cyclohexanedimethanol and combinations thereof. The I.V. of the polyester is about 0.5-1.0.

The flexible poly(etherester) and rigid polyester may be combined by conventional plastic melt-mixing methods such as, for example, melt blending using an extruder. The blends are useful in injection molded articles, such as fascia and tubing, and sheet material for thermoformed articles.

The following examples are submitted for a better understanding of the invention. In the examples, the Polymer "X" is described as having an I.V. of 1.23 and recurring units from
99.5 mol % 1,4-cyclohexanedicarboxylic acid (trans content about 90%),
0.5 mol % trimellitic anhydride,
91.1 mol % 1,4-cyclohexanedimethanol,
8.9 mol % poly (oxytetramethylene) glycol having a molecular weight of 1000.

Polymer "Y" is described as a polyester having an I.V. of 0.75 and recurring units from
100 mol % terephthalic acid,
68 mol % 1,4-cyclohexanedimethanol,
32 mol % ethylene glycol.

Polymer "Z" is described as a polyester having an I.V. of 0.75 and recurring units from
100 mol % terephthalic acid,
69 mol % ethylene glycol,
31 mol % 1,4-cyclohexanedimethanol.

EXAMPLES

Example 1.

Polymer X is blended in varying ratios with Polymer Y by mixing pellets then compounding on a single screw extruder. The resulting blend is injection molded into bars for testing. Surprisingly, it was found that the flexural modulus, measured according to ASTM D790, of the blends was higher than the expected values. It may be observed that the values actually obtained on the blends are above the expected values.

Another surprising result is the notched Izod impact strength (ASTM D256) at 23° C. As shown in Table 1 below, the impact strength of Polymer X is substantially increased by addition of even small amounts of Polymer Y.

TABLE 1

| % Polymer Y in Blend | Flexural Modulus, psi | Notched Izod at 23° C. ft-lb/in. |
| --- | --- | --- |
| 0 | 19000 | 9.6 |
| 10 | 27000 | 11.0 |
| 25 | 48000 | 13.7 |
| 35 | 92000 | 22.6 |

Example 2.

Similar blends were prepared from Polymer X and Polymer Z. The flexural modulus is again unexpectedly high. Table 2 illustrates that surprising increases in notched Izod impact strength were also obtained.

TABLE 2

| % Polymer Z in Blend | Flexural Modulus, psi | Notched Izod at 23° C. ft-lb/in. |
| --- | --- | --- |
| 0 | 19000 | 9.6 |
| 10 | 28000 | 10.3 |
| 25 | 72000 | 14.3 |
| 35 | 110000 | 16.3 |

Example 3

In this example, flexible polyetheresters are blended with relatively rigid polyesters and the flexural modulus is measured. The flexible polyetherester is Polymer X, and the relatively rigid polyester is polyethylene terephthalate having an I.V. of 0.70.

| % Polymer X | % Polyethylene Terephthalate | Flexural Modulus, psi |
| --- | --- | --- |
| 100 | 0 | 20,000 |
| 80 | 20 | 107,000 |
| 60 | 40 | 129,000 |
| 40 | 60 | 176,000 |
| 20 | 80 | 306,000 |
| 0 | 100 | 390,000 |

Example 4.

Flexible polyetheresters are blended with relatively rigid polyesters as indicated in the following table, and the flexural modulus is measured. The flexible polyetherester is Polymer X and the relatively rigid polyester is a polyester of terephthalic acid, 68 mol % 1,4-cyclohexanedimethanol and 32 mol % ethylene glycol having an I.V. of 0.75.

| % Polymer X | % Polyester | Flexural Modulus, psi |
| --- | --- | --- |
| 100 | 0 | 20,000 |
| 80 | 20 | 46,000 |
| 60 | 40 | 100,000 |
| 40 | 60 | 260,000 |
| 20 | 80 | 224,000 |
| 0 | 100 | 269,000 |

Example 5.

Flexible polyetheresters are blended with relatively rigid polyesters as shown in the following table and properties are measured. The flexible polyetherester is the same as Polymer X, except the trimellitic anhydride is omitted. The relatively rigid polyester is Polymer Y. The data shown in parantheses is the predicted value for comparison, showing the modulus of the blends according to this invention being higher than expected.

| % Flexible Polyetherester | % Polymer Y | Flexural Modulus, psi | Notched Izod ft-lb/in. |
| --- | --- | --- | --- |
| 100 | 100 | 18,000 (18,000) | 10.2 |
| 80 | 20 | 39,000 (32,000) | 12.3 |
| 60 | 40 | 100,000 (52,000) | 20.6 |
| 40 | 60 | 155,000 (80,000) | |
| 20 | 80 | 240,000 (150,000) | |
| 0 | 100 | 260,000 (260,000) | |

EXAMPLE 6.

Flexible polyetheresters are blended with relatively rigid polyesters as shown in the following table and properties are measured. The flexible polyetherester is the same as Polymer X, except the concentration of 1,4-cyclohexanedimethanol is 70 mol % and the concentration of the poly(oxytetramethylene glycol) is 30 mol %. The relatively rigid polyester is Polyester Y.

| % Flexible Polyetherester | % Polymer Y | Flexural Modulus, psi ( ) Indicates Predicted Value | Notched Izod ft-lb/in. |
|---|---|---|---|
| 150 | 0 | 9,500 (9,950) | 7.3 |
| 80 | 20 | 25,000 (18,000) | 11.6 |
| 60 | 40 | 70,000 (36,500) | 12.9 |
| 40 | 60 | 148,000 (70,000) | |
| 20 | 80 | 215,000 (135,000) | |
| 0 | 100 | 260,000 (260,000) | |

EXAMPLE 7.

Example 6 is repeated, except the concentration of 1,4-cyclohexanedimethanol is 80 mol % and the concentration of poly(oxyteramethylene glycol) is 20 mol %.

| % Flexible Polyetherester | % Polymer Y | Flexural Modulus, psi ( ) Indicates Predicted Value | Notched Izod ft-lb/in. |
|---|---|---|---|
| 100 | 0 | 23,500 (23,500) | 11.2 |
| 80 | 20 | 44,500 (37,000) | 13.8 |
| 60 | 40 | 88,000 (60,500) | 23.9 |
| 40 | 60 | 160,000 (99,000) | |
| 20 | 80 | 230,000 (170,000) | |
| 0 | 100 | 260,000 (260,000) | |

EXAMPLE 8

Additional blends are made as in the previous examples, using Polymer X and Polymer Z. In this example, the polyester is made by the direct esterification of terephthalic acid rather than using dimethyl terephthalate (I.V.=0.75).

| % Polymer X | % Polymer Z | Flexural Modulus, psi ( ) Indicates Predicted Value | Notched Izod ft-lb/in. |
|---|---|---|---|
| 100 | 0 | 19,000 (19,000) | 9.6 |
| 80 | 20 | 44,000 (34,000) | 13.1 |
| 60 | 40 | 120,000 (56,000) | 17.5 |
| 40 | 60 | 230,000 (96,000) | |
| 20 | 80 | 275,000 (170,000) | |
| 0 | 100 | 290,000 (290,000) | |

EXAMPLE 9.

Example 8 is repeated, except the relatively rigid polyester is derived from 100 mol % terephthalic acid, 80 mol % 1,4-butanediol and 20 mol % 1,4-cyclohexanedimethanol (I.V.=0.85).

| % Polymer X | % Polyester | Flexural Modulus, psi ( ) Indicates Predicted Value | Notched Izod ft-lb/in. |
|---|---|---|---|
| 100 | 0 | 19,000 (19,000) | 9.6 |
| 80 | 20 | 44,000 (34,100) | 13.7 |
| 60 | 40 | 122,000 (56,200) | 18.2 |
| 40 | 60 | 231,000 (97,000) | |
| 20 | 80 | 278,000 (172,000) | |
| 0 | 100 | 300,000 (300,000) | |

Conventional additives may be used in either component or the blend. Such additives include colorants, stabilizers, plasticizers, flame retardants, adhesive promoters, etc.

As used herein, the inherent viscosity (I.V.) is measured at 25° C. using 0.50 gram of copolyester per 100 ml of a solvent consisting of 60 percent by weight phenol and 40 percent by weight tetrachloroethane.

The Flexural Modulus and notched Izod impact strength tests used herein are in accordance with ASTM D790 and ASTM D256 respectively.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. A composition comprising a blend of a flexible poly(etherester) with a more rigid polyester, the blend comprising
    (A) about 98–60 weight % of a flexible poly(ether-ester) having an I.V. of about 0.8–1.5 and recurring units from
        (1) a dicarboxylic acid component consisting essentially of 1,4-cyclohexanedicarboxylic acid having a trans isomer content of at least 70%,
        (2) a glycol component consisting essentially of
            (a) about 95 to about 65 mol % 1,4-cyclohexanedimethanol, and
            (b) about 5 to about 35 mol % poly(oxytetramethylene) glycol having a molecular weight of about 500–1100, and
    (B) about 2–40 weight % of a relatively rigid polyester consists essentially of recurring units of terephthalic acid, and recurring units from at least one of the glycols selected from ethylene glycol, 1,4-butanediol, and 1,4-cyclohexane-dimethanol,
the blends having increased stiffness and notched Izod impact strength when compared to the poly(ether-ester) alone.

2. A thermoformed article comprising the composition of claim 1.

3. An injection molded article comprising the composition of claim 1.

* * * * *